Feb. 23, 1965 R. CHAPMAN 3,170,604
APPARATUS FOR APPLYING AN ADHESIVE TO PLANAR ARTICLES
SUCH AS WEBS OR SHEETS OF VENEER
Filed Aug. 7, 1961 3 Sheets-Sheet 1

INVENTOR.
RALPH CHAPMAN
BY
BUCKHORN, CHEATHAM & BLORE
ATTORNEYS

INVENTOR.
RALPH CHAPMAN
BY
BUCKHORN, CHEATHAM & BLORE
ATTORNEYS

Feb. 23, 1965  R. CHAPMAN  3,170,604
APPARATUS FOR APPLYING AN ADHESIVE TO PLANAR ARTICLES
SUCH AS WEBS OR SHEETS OF VENEER

Filed Aug. 7, 1961  3 Sheets-Sheet 3

*INVENTOR.*
RALPH CHAPMAN
BY
BUCKHORN, CHEATHAM & BLORE
*ATTORNEYS*

United States Patent Office 3,170,604
Patented Feb. 23, 1965

3,170,604
APPARATUS FOR APPLYING AN ADHESIVE TO PLANAR ARTICLES SUCH AS WEBS OR SHEETS OF VENEER
Ralph Chapman, Corvallis, Oreg., assignor to Wood Processes, Oregon Ltd., Corvallis, Oreg., a partnership
Filed Aug. 7, 1961, Ser. No. 129,906
5 Claims. (Cl. 222—233)

My present invention comprises a machine for applying a powder, such as a powdered adhesive, to articles, such as webs of interlaced fibers and sheets of veneer, the machine being of particular utility in the manufacture of plywood, laminated fiberboard and other multi-ply products employing adhesive to hold the several plies to each other. A single apparatus of the present invention is herein disclosed, the illustrated embodiment being a portion of a machine for forming laminated products comprising a plurality of wood veneer plies and outer plies of consolidated fibers such as disclosed in my copending application Serial No. 842,528, filed September 25, 1957, the machine being one of a battery of such machines forming portions of a layup machine such as disclosed in my copending application Serial No. 129,601, filed concurrently herewith. In that machine a first fiber web is formed and laid onto a traveling succession of caul plates moving at a constant speed, adhesive is applied thereto by a machine of the present invention, a ply of veneer skiffs is then laid on the surface of the web and adhesive applied thereto by a second machine of the present invention, a ply of veneer crossbands is laid on the surface of the skiffs, and so on until the completed assembly of veneers and outer plies of fiber is formed as an endless ribbon. The endless ribbon is severed into sections commensurate with the size of the individual caul plates, and the caul plates, each bearing an individual plywood layup, are then introduced into a press such as disclosed and claimed in my copending application Serial No. 46,554, filed August 1, 1960.

While I refer particularly to an adhesive in the foregoing paragraph, it is to be appreciated that the machine is capable of applying other powdered materials such as pigments, flameproofing materials, fungicides, insecticides and the like. The machine is capable of applying a fine, dry powder, or a flocculent powder, or a powder having admixed therewith some flocking agent such as a wax or petrolatum. Among the adhesives which have been successfully applied by the machine are soybean flour, powdered phenol formaldehyde or urea formaldehyde resins, powdered animal glues including blood albumin, powdered casein derivative adhesives, and mixtures of the foregoing.

The principal object of the present invention is to provide means for applying a uniform film of powdered adhesive to a surface of a planar article such as a fiber web or sheet of veneer.

A further object of the present invention is to provide a machine of the foregoing character in which the amount of powder applied per increment of article surface may be varied as desired.

A further object of the present invention is to provide a machine of the foregoing character which may handle a wide variety of powdered materials.

The foregoing objects and advantages of the present invention may be more readily appreciated from inspection of the following specification, taken in connection with the accompanying drawings, in which like numerals refer to like parts throughout and in which a preferred embodiment of the present invention is disclosed and explained. It is to be appreciated that the means herein disclosed and described for advancing the article with respect to the powder applicator is that which has been developed for the purpose of automatically laying up fiber-surfaced plywood, and other conveying equipment designed for advancing webs or sheets in other manners may be employed without alteration of the applicating machine itself.

Figure 1:
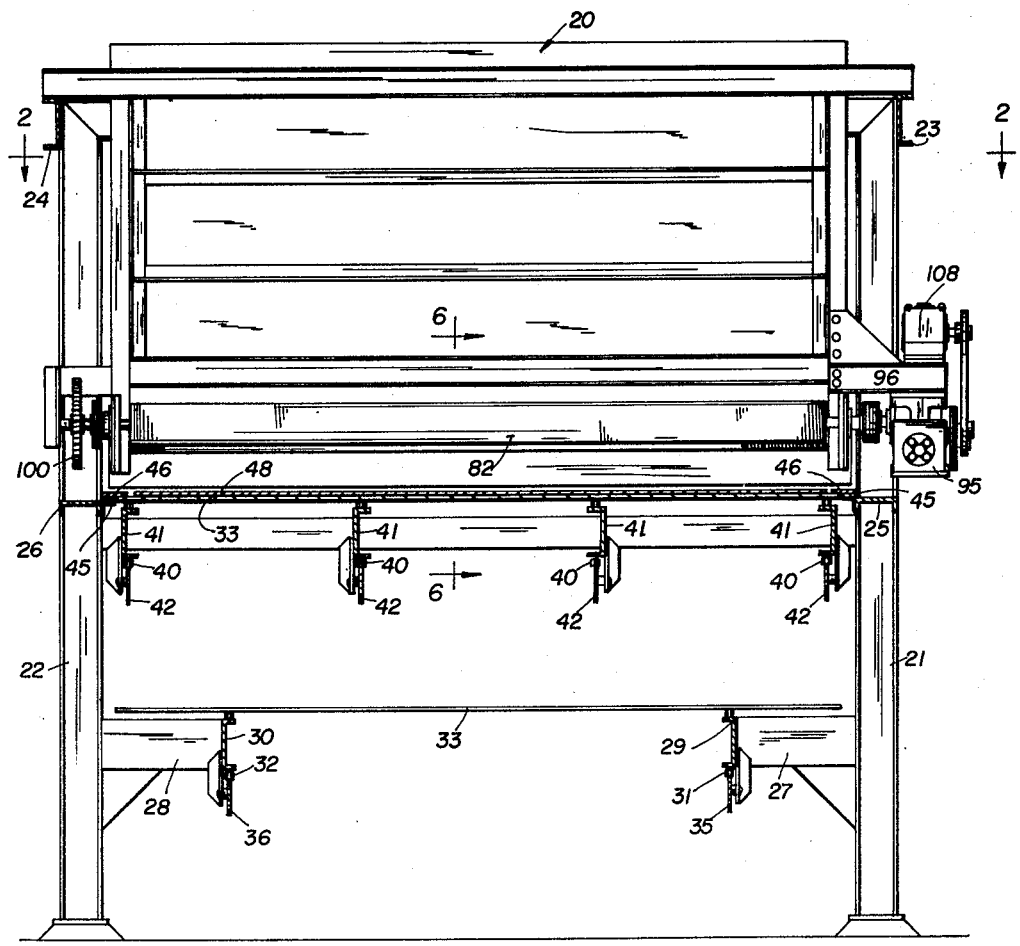
FIG. 1 is a vertical section through the plywood lay-up machine disclosed in the above-identified copending application Serial No. 129,601, the view being taken substantially along line 1—1 of FIG. 2, and disclosing a front elevation of the applicator of the present invention.

The applicator mechanism comprises a bin 20 mounted in a frame including upright posts 21 and 22 and upper longitudinal channel bars 23 and 24. The posts are also connected together by intermediate longitudinal channel bars 25 and 26. At a lower level, brackets 27 and 28 extend inwardly respectively from the posts 21 and 22 and support longitudinally extending channel bars 29 and 30. The channel bars 29 and 30 respectively support endless conveyor chains 31 and 32 which return caul plates 33 from the press (not shown) to the beginning of the assembly machine. The endless chains are suitably driven by means which are not shown, and their lower flights are supported by idler sprockets 35 and 36, respectively. The caul plates are elevated to the level of the longitudinal channel bars 25 and 26 by suitable means which are not shown, and progressed beneath the powder applicators of the present invention by a plurality of endless chains 40 supported upon longitudinally extending channel bars 41 and driven by suitable means (not shown). Lower flights of the chains 40 are guided by idler sprockets 42. The platens are positioned in substantially edge-to-edge relationship and progressed at a constant rate beneath the bin 20, the platens traveling in a linear direction and in a horizontal plane.

The platens are preferably made of an aluminum alloy and are about one-quarter to three-eighths of an inch in thickness. They are engaged by suitable lugs (not shown) on the chains 40 and their edges are guided by lateral guide members 45 mounted on the frame. Guide bars 46 also mounted on the frame overhang the edges of the platens so as to maintain them on the chains. As disclosed in the above application Serial No. 129,601, a moist web 48 of interlaced fibers is formed as an endless ribbon which is laid upon and covers the surfaces of the platens, such ribbon of interlaced fibers being one of the articles to which the powder is applied by the present invention. The web is progressed at a constant speed in a horizontal plane and in a linear direction beneath the bin 20. The interior of the bin 20 terminates at its lower end above the upper surface of the web 48, and extends transversely with respect to the direction of travel of the web from edge to edge thereof. It is to be appreciated that in the plywood layup machine alternate layers of skiffs and crossband veneers are subsequently laid on top of each other and each layer is dusted with adhesive powder, the whole being then covered with a second fiber web. In the plywood layup process the fiber web 48 is quite moist, and so are the skiffs and crossband veneers, so that any dry powder adhesive requiring moisture for setting obtains its moisture from the articles themselves. However, moisture may be supplied by a spray, as will presently appear.

Figure 6:
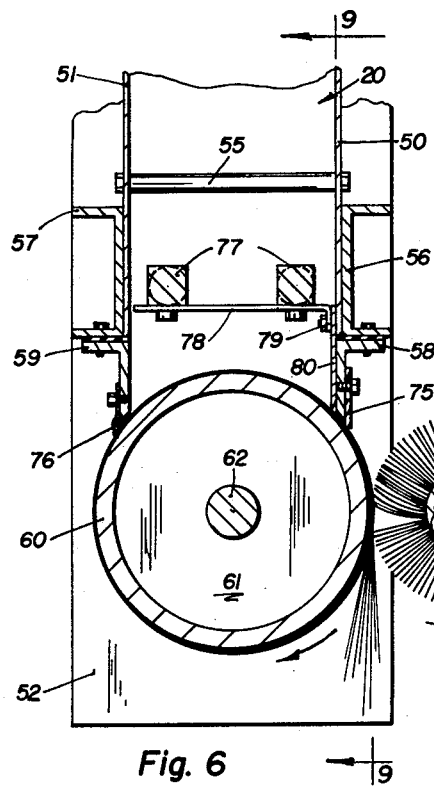
FIG. 6 is a vertical section, on an enlarged scale, taken substantially along line 6—6 of FIG. 1.

The bin 20 is preferably in the form of a tall bin, narrow in the direction of travel, the bin including a plurality of vertically positioned, smooth-surfaced plates welded together and including a front wall 50, a rear wall 51, a side wall 52 and an opposite side wall 53, the walls being maintained by external framing members as illustrated and by internal tie rods 55. The powder is dumped into the bin through its open upper end and packs toward the bottom of the bin. Due to the smooth vertical walls of the bin the powder constantly settles toward the bottom. However, vibrating mechanism (not shown) may be attached to the bin or a wall or walls of the bin so as to assure downward travel of the powder. The side walls 52 are wider than the space between the front and rear walls, and extend a distance therebelow (FIG. 6). The front and rear walls terminate along a horizontal plane, thereby providing a rectangular, horizontal opening at the bottom of the bin, as wide as the interior of the bin in the direction of travel of the articles, and as long as the interior of the bin in the transverse direction. The front and rear wall plates 50 and 51 are braced at their lower ends by external channel bars 56 and 57, respectively, to the lower edges of which are affixed angle bars 58 and 59, respectively, the inner surfaces of which form flush portions of the inner surfaces of the bin. The lower edges of the angle bars 58 and 59 are inwardly beveled so as to lie substantially tangential to portions of a metering cylinder 60 which fills the opening at the bottom of the bin. The cylinder is preferably formed of a section of pipe, the ends thereof being affixed to discs 61 mounted upon a coaxial shaft 62. The cylinder is just a few thousandths of an inch shorter than the distance between the side walls 51 and 52 so that the cylinder may rotate while plugging the opening at the bottom of the bin. The external diameter of the cylinder is greater than the space between the front and rear walls. The cylinder extends horizontally, its axis of rotation is substantially equidistant between the planes of the front and rear inner surfaces of the bin and located therebelow, the upper surface of the cylinder projecting into the interior of the bin.

Figure 10:
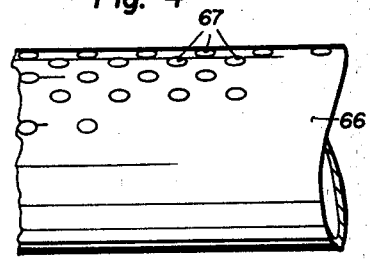
FIG. 10 is a partial side view of a modified form of metering cylinder which may be utilized.
Figure 11:
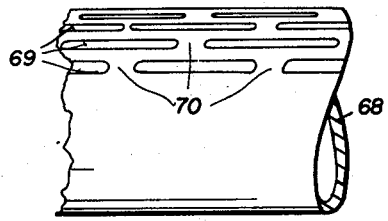
FIG. 11 is a similar view showing another modified form of metering cylinder which may be utilized.

In a preferred form of cylinder which seems to handle all powdered adhesives and meter the amount thereof applied to the article, the exterior surface of the cylinder is provided with a plurality of shallow grooves 64 which, in the illustrated embodiment, are substantially an eighth of an inch wide, practically the same depth, and located on half inch centers, the grooves being continuous and extending circumferentially about the cylinder. A modified cylinder 66, illustrated in FIG. 10, is provided with a plurality of shallow pockets 67 which are staggered in a plurality of longitudinal rows along the surface of the cylinder. Another modified form of cylinder 68, illustrated in FIG. 11, has a plurality of axially extending shallow grooves 69 separated by intermittent lands 70 as illustrated. The peripheral grooves 64, the pockets 67, and the axial grooves 69, all form regularly spaced metering depressions of relatively equal capacity, and all are relatively shallow depressions with sloping sides. The metering depressions may be spread evenly throughout the entire surface of the cylinder so as to provide for the application of a uniform film of powder throughout the surface of the article, or the depressions may be interrupted and exist in bands longitudinally of the cylinder so as to apply stripes of powder to the article.

The cylinder 60 is rotated at a constant speed, by means to be described, in the direction of the arrow indicated in FIG. 6. A vertically adjustable sealing blade 75 is mounted on the exterior surface of the angle bar 58 and contacts the emerging surface of the cylinder to prevent the escape of material from the bin except as packed into the depressions in the cylinder. A vertically adjustable strip 76 of mohair or equivalent material is mounted on the angle bar 59 so as to engage the surface of the cylinder and seal the depressions thereof on the side of the cylinder entering the bin.

Figure 2:
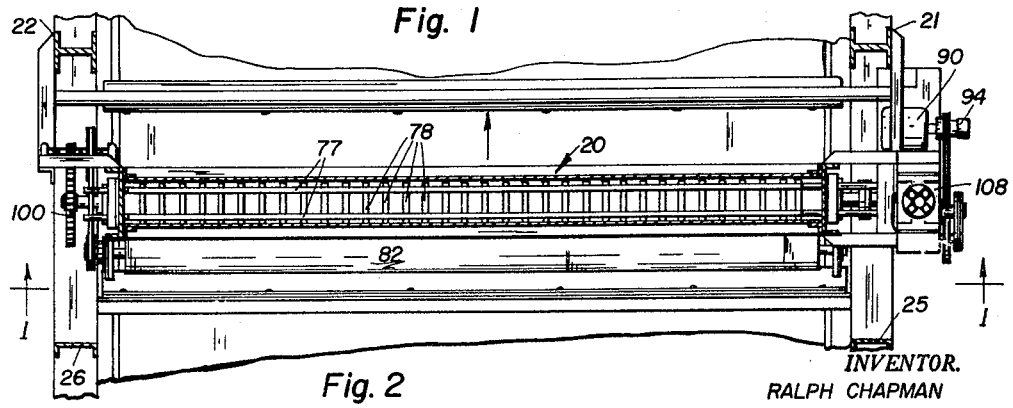
FIG. 2 is a horizontal section taken substantially along line 2—2 of FIG. 1.
Figure 9:
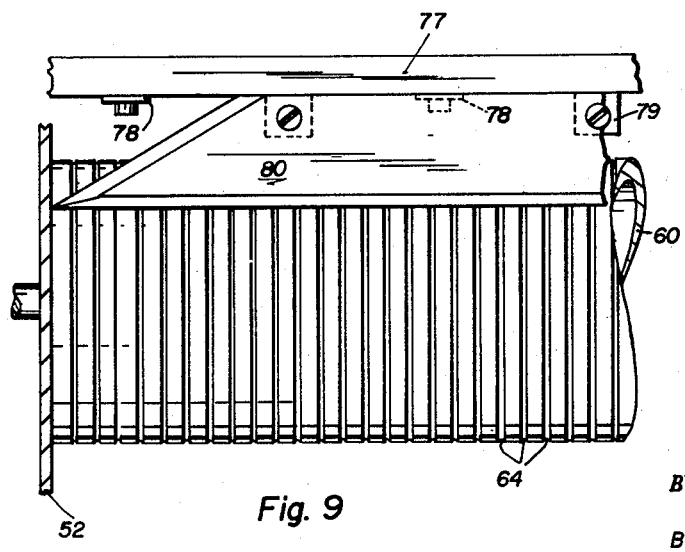
FIG. 9 is a vertical section taken substantially along line 9—9 of FIG. 6.

A pair of rods 77 extend horizontally through side wall 52 and side wall 53 a short distance above the upper surface of the cylinder. These bars 77 are reciprocated a short distance longitudinally, by means to be described, and support a plurality of transversely positioned blades 78 (FIGS. 2 and 6), the assembly forming a shaker grate extending across the lower portion of the bin just above the cylinder so as to undercut any bridges forming in the powder, particularly flocculent powder such as blood albumin or soybean flour. A plurality of brackets 79 (FIG. 9), also mounted on the bars 77, support a doctor blade 80 which bears against the surface of the cylinder just inside of wall 50 as the cylinder surface emerges from the bin. The doctor blade is provided with a beveled lower edge and beveled end edges so that it may cut through the mass of powder as it reciprocates. The doctor blade aids in packing the powder into the metering depressions of the cylinder. However, some types of powder may not need the doctor blade, particularly blood albumin which has a strong tendency to flock and may be sufficiently packed by the sealing blade 75.

A cylindrical brush 82, including a concentric drive shaft 83, a concentric bristle mounting core 84 surrounding the shaft, and a plurality of relatively long, stiffly flexible, closely mounted bristles 85, is positioned adjacent the emerging surface of the cylinder. The bristles are preferably relatively stiff and durable, such as heavy nylon bristles. The cylinder is so located that the bristles engage the bottoms of the depressions and flip the powder therefrom downwardly toward the traveling article by reason of the brush being driven in a direction of rotation opposite that of the direction of rotation of the cylinder 60 and at a greater peripheral speed than the peripheral speed of the cylinder 60. The axes of the cylinder 60 and brush 82 are parallel and preferably lie in a hoizontal plane so that the parting angle between the two faces downwardly toward the traveling article at such a height that the powder will be applied as a substantially uniform thin film throughout the surface of the article.

The cylinder, brush and reciprocating members are driven by a common motor as follows: A motor 90 is suitably mounted on the frame for adjustment toward and away from the bin longitudinally of the frame. The motor has a pulley 91 mounted thereon which drives a belt 92 engaging a driven pulley 93, the pulleys preferably including diameter adjusting means such as indicated at 94 whereby adjustment in speed of the driven pulley may be accomplished. The pulley 93 drives a reduction gear mechanism, indicated at 95, which is connected to the shaft 62 of the cylinder 60 through a flexible coupling 96, whereby the cylinder 60 is rotated at a constant speed which may be adjusted to vary the quantity of powder extracted from the bin. Fixed to the opposite end of shaft 62 is a large gear 100 which drives a pinion 101 fixed to a pulley 102. The pulley drives a belt which in turn drives a driven pulley 103 fixed to the shaft 83 of the cylindrical brush 82. It will be recognized from the foregoing that the brush 82 is driven at a higher speed than the cylinder 60, in the opposite direction of rotation and at a constant speed, and that the speed may be adjusted proportionately as the speed of the cylinder is adjusted.

Figure 4:
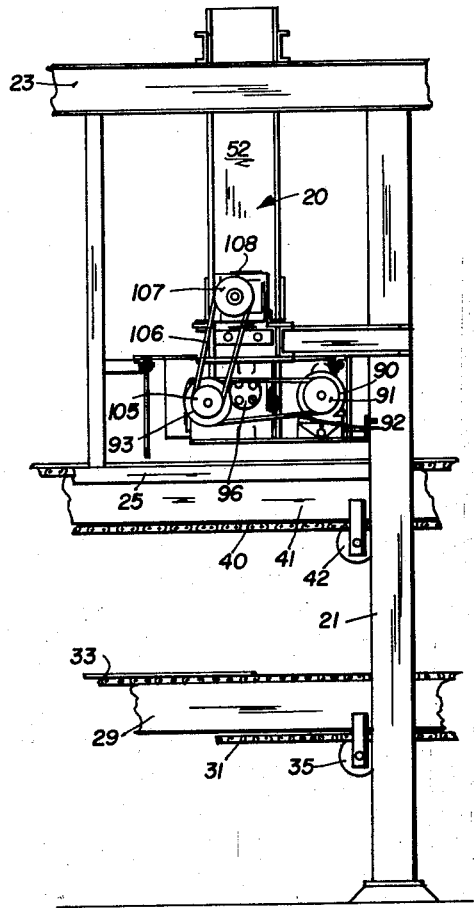
FIG. 4 is a view in elevation of the right side of FIG. 1.
Figure 5:
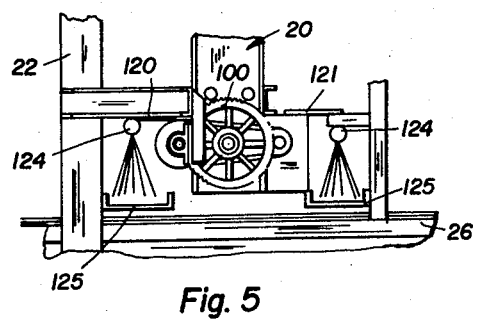
FIG. 5 is a partial view corresponding to FIG. 3 and disclosing a modified arrangement.
Figure 7:
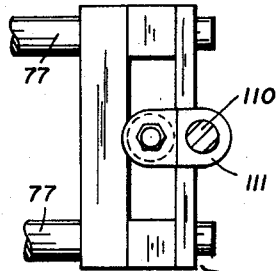
FIG. 7 is a partial horizontal section showing a detail of the mechanism.
Figure 8:
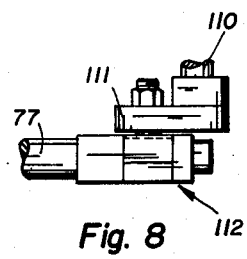
FIG. 8 is a side view of the mechanism disclosed in FIG. 7.

A pulley 105 mounted coaxially with pulley 93 drives a belt 106 which extends upwardly and drives a pulley 107, the pulley 107 driving a reduction gear mechanism 108 (FIG. 4). The output shaft of the reduction gear mechanism 108 projects downwardly, the shaft being indicated at 110 in FIGS. 7 and 8. A crank 111 mounted on the lower end of the shaft has a roller crank pin engaged in a Scotch yoke device 112 mounted on the ends of the reciprocating bars 77. The bars 77 are guided in suitable bearings (not shown) in the walls 52 and 53. The rotation of the crank 111 is relatively slow and the doctor blade and shaker grate located within the bin are thereby slowly reciprocated within the bin in timed relation to the rotation of the cylinder and brush.

Figure 3:
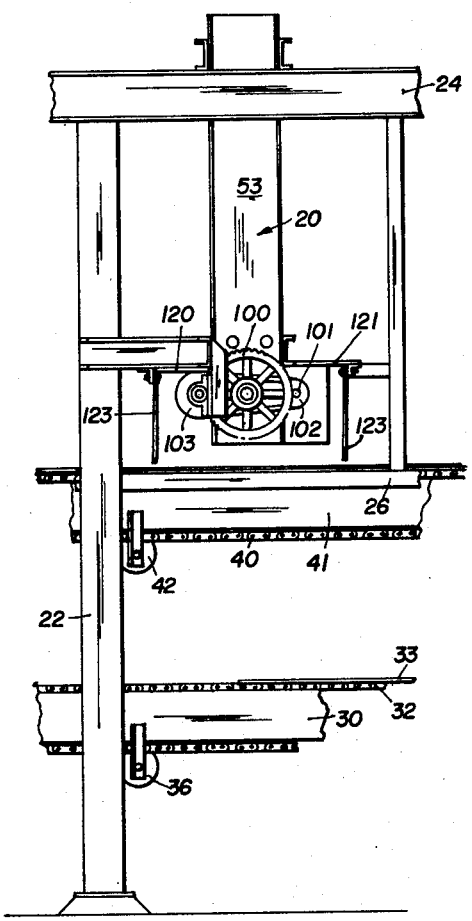
FIG. 3 is a view in elevation of the left side of FIG. 1.

In order to prevent some forms of powder from flying about the plant, the applicating mechanism may be boxed in by means such as plates 120 and 121 mounted on the frame (FIG. 3) and cloth curtains 123 extending alongside of the cylinder brush down to a position closely above the surface of the traveling article. With some types of powders it may be desirable to replace the fabric curtains 123 with spray pipes 124 arranged to project a spray curtain around the applicator. With some types of powders and articles the spray may deposit a fine mist which is allowed to engage the product to supply moisture, for example for setting a casein adhesive. In other processes the spray may be collected in transverse troughs 125 which lead into a waste system. With some types of powders, such as blood albumin, there is no need for any curtaining or other device for preventing the powder from flying through the plant.

Having illustrated and described a preferred embodiment of my invention, I claim as my invention all such modifications as come within the true spirit and scope of the following claims.

I claim:
1. Apparatus for applying a powdered adhesive to a surface of a traveling, planar article:
   (a) said apparatus comprising an upstanding, relatively long, narrow bin for holding a supply of said powder;
   (b) said bin having a rectangular outlet opening in the bottom thereof;
   (c) a cylinder mounted adjacent said opening for rotation about a horizontal axis, with said axis being parallel to the longitudinal axis of said opening and with the upper surface of said cylinder projecting into the interior of said bin and filling said opening to provide a movable bottom wall for said bin;
   (d) said cylinder having a diameter greater than the width of said opening;
   (e) means for rotating said cylinder at a predetermined peripheral speed and in one direction;
   (f) said cylinder having a plurality of depressions in its surface into which powder within said bin may settle thereby to be removed from said bin;
   (g) a brush means rotatably mounted in axially parallel relationship to and adjacent said cylinder, and externally of said bin and including means for driving said brush means in a direction of rotation opposite to the direction of rotation of said cylinder for removing said powder from said depressions upon the emergence of the latter from said bin;
   (h) a plurality of generally parallel spaced apart rods disposed horizontally within said bin and extending the length thereof;
   (i) said rods being positioned above said cylinder and relatively closer to said opening than to the top of said bin;
   (j) a plurality of spaced apart blades attached to and spanning the distance between said rods such that said rods and blades define a grate within said bin;
   (k) a longitudinally disposed doctor blade attached to said grate and extending downwardly toward said cylinder;
   (l) said doctor blade having a lower, straight edge engaging the surface of said cylinder throughout substantially the length of the latter and at a position near the wall of said bin toward which the surface of said cylinder within said bin rotates;
   (m) and means for reciprocating said rods in a direction longitudinally of said cylinder so that said blades undercut any bridges formed in said powder and said doctor blade packs said powder uniformly into said depressions to a level even with the surface of said cylinder.

2. Apparatus according to claim 1 wherein said doctor blade is provided with a beveled lower edge and beveled end edges.

3. Apparatus according to claim 1 wherein said doctor blade extends vertically downwardly from said grate in sliding engagement with the wall of said bin toward which the surface of said cylinder within said bin rotates.

4. Apparatus according to claim 3 wherein said grate is disposed horizontally within said bin and closely adjacent the surface of said cylinder.

5. Apparatus according to claim 1 wherein said cylinder, said brush and said rods are all operatively connected to the same power means.

References Cited in the file of this patent

UNITED STATES PATENTS

| | | |
|---|---|---|
| 2,152,500 | Rasmussen | Mar. 28, 1939 |
| 2,156,901 | Brady | May 2, 1939 |
| 2,276,486 | Harshberger | Mar. 17, 1942 |
| 2,319,177 | Wright | May 11, 1943 |
| 2,321,082 | Harshberger | June 8, 1943 |
| 2,370,168 | Irmscher | Feb. 27, 1945 |
| 2,870,739 | Rodli | Jan. 27, 1959 |